United States Patent
Bloks

(10) Patent No.: US 7,093,256 B2
(45) Date of Patent: Aug. 15, 2006

(54) METHOD AND APPARATUS FOR SCHEDULING REAL-TIME AND NON-REAL-TIME ACCESS TO A SHARED RESOURCE

(75) Inventor: Rudolf Henricus Johannes Bloks, Sunnyvale, CA (US)

(73) Assignee: Equator Technologies, Inc., Campbell, CA (US)

( * ) Notice: Subject to any disclaimer, the term of this patent is extended or adjusted under 35 U.S.C. 154(b) by 362 days.

(21) Appl. No.: 10/318,435

(22) Filed: Dec. 13, 2002

(65) Prior Publication Data
US 2004/0117577 A1 Jun. 17, 2004

(51) Int. Cl.
G06F 12/00 (2006.01)
G06F 13/00 (2006.01)

(52) U.S. Cl. ........................ 718/102; 718/103; 718/107; 711/167; 710/45; 710/117; 710/118; 710/241; 710/244; 710/309; 370/498; 370/462; 370/395.4

(58) Field of Classification Search ................ 711/167, 711/169; 718/102, 103, 107; 710/40, 41, 710/44, 45, 107, 112, 113, 116, 117, 118, 710/309, 241, 244; 370/437–439, 441–445, 370/447, 448, 461, 498, 501, 502, 395.4, 370/395.41, 395.42, 395.43, 462, 395.2, 370/395.21, 230, 230.1
See application file for complete search history.

(56) References Cited

U.S. PATENT DOCUMENTS

| | | | |
|---|---|---|---|
| 4,989,133 A | 1/1991 | May et al. | 718/102 |
| 5,325,525 A | 6/1994 | Shan et al. | 718/104 |
| 5,640,563 A | 6/1997 | Carmon | 718/102 |
| 5,721,922 A | 2/1998 | Dingwall | 718/103 |
| 5,902,352 A | 5/1999 | Chou et al. | 718/102 |
| 5,974,439 A * | 10/1999 | Bollella | 718/104 |
| 5,995,745 A | 11/1999 | Yodaiken | 703/26 |
| 6,028,843 A | 2/2000 | Delp et al. | 370/235 |
| 6,081,505 A * | 6/2000 | Kilkki | 370/230 |
| 6,105,048 A | 8/2000 | He | 718/100 |
| 6,112,221 A | 8/2000 | Bender et al. | 718/102 |
| 6,167,425 A | 12/2000 | Beckhoff | 718/103 |
| 6,182,197 B1 * | 1/2001 | Dias et al. | 711/151 |
| 6,195,701 B1 | 2/2001 | Kaiserswerth et al. | 709/231 |
| 6,282,560 B1 | 8/2001 | Eilert et al. | 718/100 |
| 6,385,638 B1 | 5/2002 | Baker-Harvey | 718/107 |
| 2004/0100967 A1 * | 5/2004 | Robotham et al. | 370/395.4 |
| 2004/0114516 A1 * | 6/2004 | Iwata et al. | 370/230.1 |

OTHER PUBLICATIONS

Exploiting Application Turability for Efficient, Predictable Parallel Resource Management; Chang et al.; Department of Computer Science; Courant Institute of Mathmatical Sciences, New York University; pp. 1-18; Oct. 7, 1998.

* cited by examiner

*Primary Examiner*—Christian P. Chace
(74) *Attorney, Agent, or Firm*—Marger Johnson & McCollom P.C.

(57) ABSTRACT

A method and apparatus are provided in a computing environment for scheduling access to a resource. The method grants access to the resource by a non-real-time request when the non-real-time request can be completed before the latest possible start time at which a first real-time request must start service to timely complete all actual and anticipated real-time requests, otherwise granting the first real real-time request access to the resource.

10 Claims, 8 Drawing Sheets

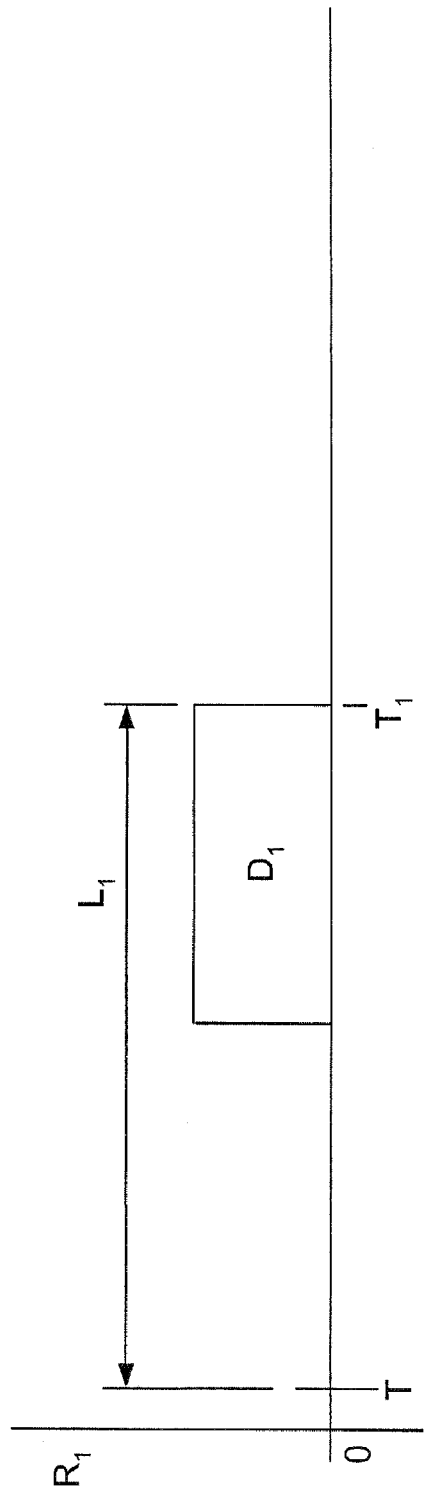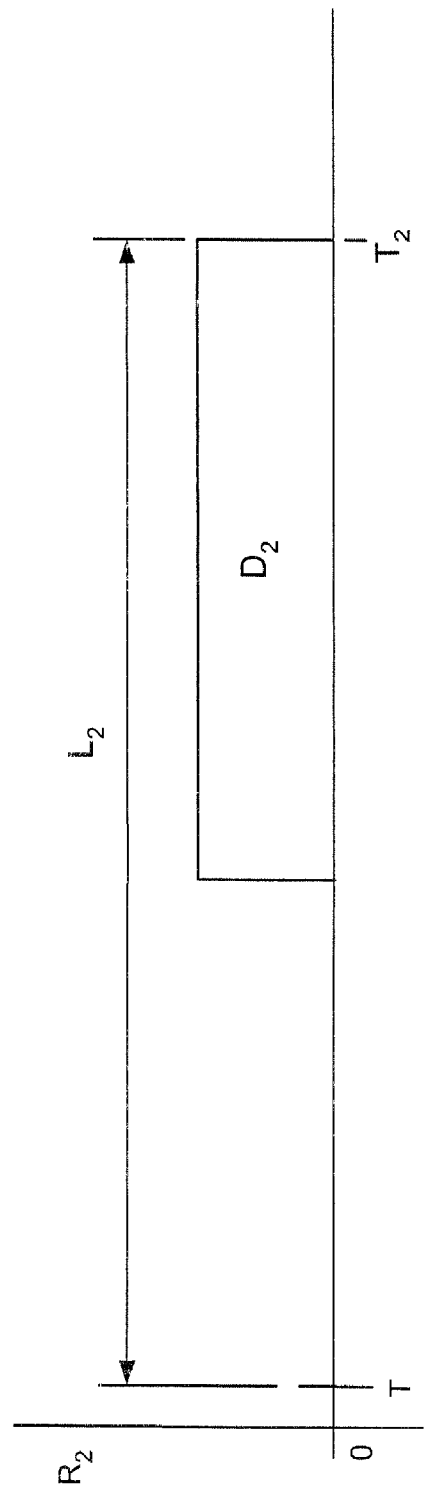

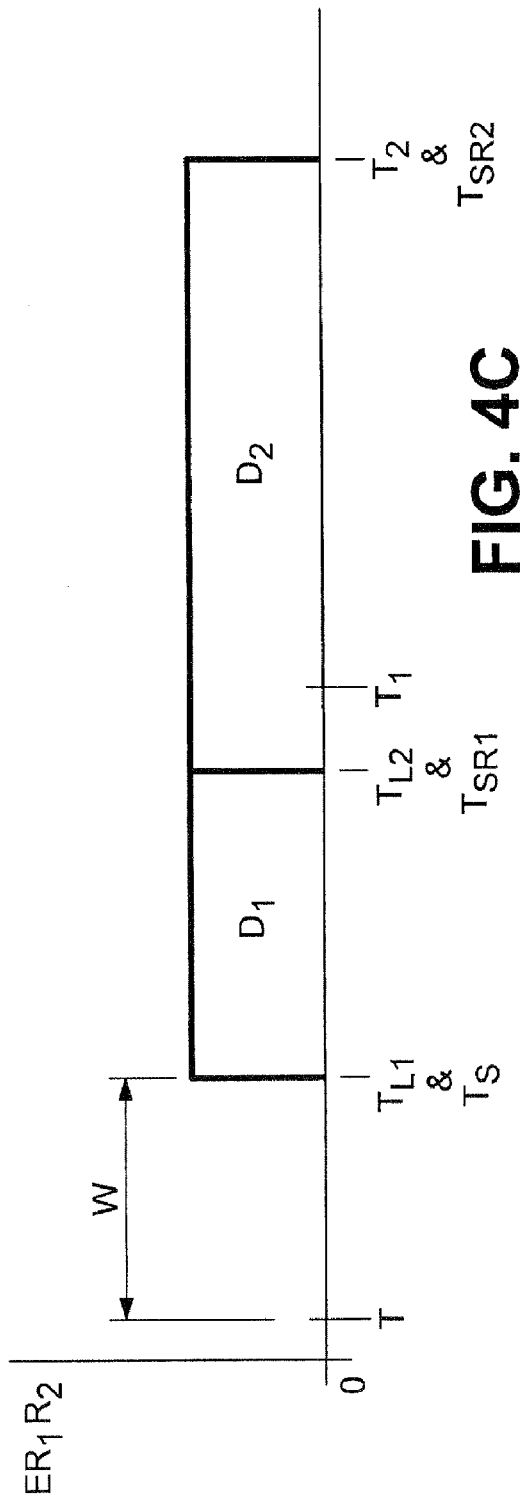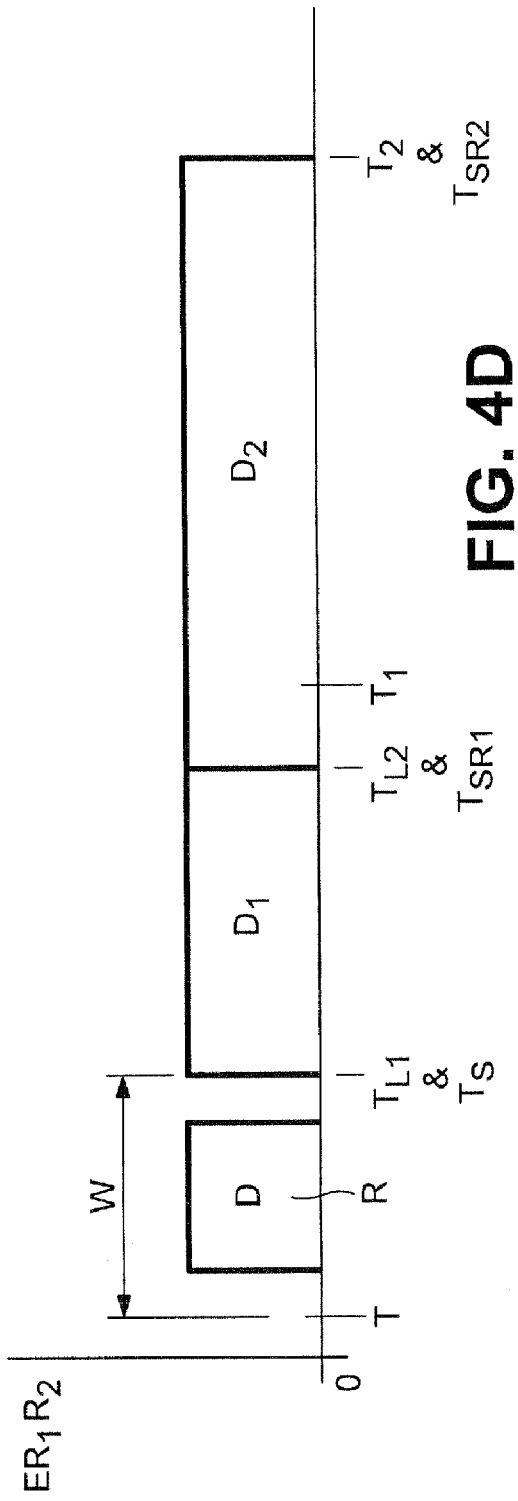

METHOD AND APPARATUS FOR SCHEDULING REAL-TIME AND NON-REAL-TIME ACCESS TO A SHARED RESOURCE

BACKGROUND

In multimedia processing systems, large amounts of data are processed in real time and typically stored in a memory between processing stages. For example, one or more processors read data from this memory, perform one or more processing steps, and write a result back into memory. Input/output devices ultimately perform the functions of sending the final result out of the system, for example to a display device, and receiving initial data into the system.

Typically, the input and output functions require real-time data to be transferred at a specific rate. Any deviations from this rate can be noticeable as artifacts, such as audio clicks, video distortion, etc, or could cause connected subsystems to fail in other ways. In order to guarantee that data can be transferred in/out of the system at a fixed rate; the devices responsible for it must have certain guarantees for accessing the memory in terms of latency and bandwidth. Latency is the time between when a device requests access to memory for data read/write task and completing accessing the memory. The end of the latency period is the deadline by which the service request must be completed, and is sometimes referred to in the specifications as required-service-completion time. Duration is how long it takes to execute the request from start of service to completion. Bandwidth is the number of such accesses that can be performed per time unit.

The processing units have far less strict requirements, since they operate at a larger data granularity, such as entire video or audio frames, rather than individual pixels or samples. A short delay in memory access can be compensated for by a higher access rate later, thus still meeting any longer-term timing requirements.

Due to this nature, systems with both real-time and non-real-time access requirements typically operate by giving priority to the real-time devices and allowing the non-real-time devices access only when no real-time device has a request outstanding. Variants on this system may limit such priority to a maximum amount of time after which the non-real-time- devices are serviced to prevent what is called 'starvation' of these lower-priority devices. A disadvantage of this approach is that the non-real-time devices suffer from decreased performance because they have to wait for access to the memory while the real-time devices go first. This happens because the scheduling algorithm used to control access has no knowledge of the service deadline requirements of the real-time requests.

One well-known method for scheduling real-time requests is the Earliest Deadline First algorithm (EDF). According to EDF, of all real-time requests waiting processing, the request having the earliest completion deadline receives the highest priority. EDF becomes problematic when there are both real-time and non-real-time clients in the system. Pure EDF cannot handle this, and the simple "extension" of this algorithm to assign any leftover bandwidth to non-real-time clients has a negative impact on the performance of those non-real-time clients. This is because priority is always given to real-time clients, even if handling a non-real-time client first would not endanger the deadlines of all real-time clients. When a non-real-time client has to wait for access, it is typically unable to continue operation until that access has been completed, forcing it to idle or stall, thus reducing its performance.

The original EDF is a fairly simple algorithm that probably can be implemented efficiently in software. When an extended EDF algorithm using software is made to include allocation of time to non-real-time requests, a processor must execute the extended EDF algorithm for priority allocation. This causes a substantial overhead of the processor time and reduces the portion of processor time available for the actual processing of all requests.

Consequently, a new scheduling method is needed for controlling access to any type of shared resource by multiple devices, the new method giving priority to non-real-time devices as long as the service deadlines for the outstanding real-time requests are met. That is, the new scheduling method should give priority to a non-real-time request even if a real-time request is pending when the non-real-time request can be performed without compromising the latency required by that real-time device. A hardware device is also needed for implementing the scheduling method, thus removing the scheduling load from the processor unit of the computing device. This frees up the processor unit.

In view of the foregoing, there is a need in the art for a new and improved method and device for extending existing scheduling algorithms to include requests by non-real-time devices and giving those devices priority if, and only if, all current and possible future real-time requests can still be executed on time.

SUMMARY

In one embodiment of the invention, a method is provided for scheduling access to a resource having a capacity for real-time and non-real-time requests, each request having a latency and a duration. The method includes the steps of scheduling real-time requests, and granting a priority access to the shared resource to a non-real-time request when the pending real-time requests and the non-real-time request do not exceed the capacity of the resource. This improves system performance while still guaranteeing that real-time requests will meet service deadlines. The method may be implemented by hardware.

Such a method can extend the algorithms commonly used for scheduling real-time requests by giving non-real-time requests a priority to run first if, and only if, all current and possible future real-time requests can still be executed on time. Furthermore, the scheduling may be performed by a dedicated hardware device to reduce the load on the processor.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

FIGS. 4a–d illustrate scheduling two real-time service requests such that a window of time W is available for priority servicing of a non-real-time request R having a duration D according to an embodiment of the invention.

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense.

In the following detailed description, numerous specific details are set forth in order to provide a thorough understanding of the present invention. However, it will be understood by those skilled in the art that the present invention may be practiced without these specific details. In some instances, well-known methods, procedures, components, and circuits have not been described in detail so as not to obscure the present invention.

Figure 1:
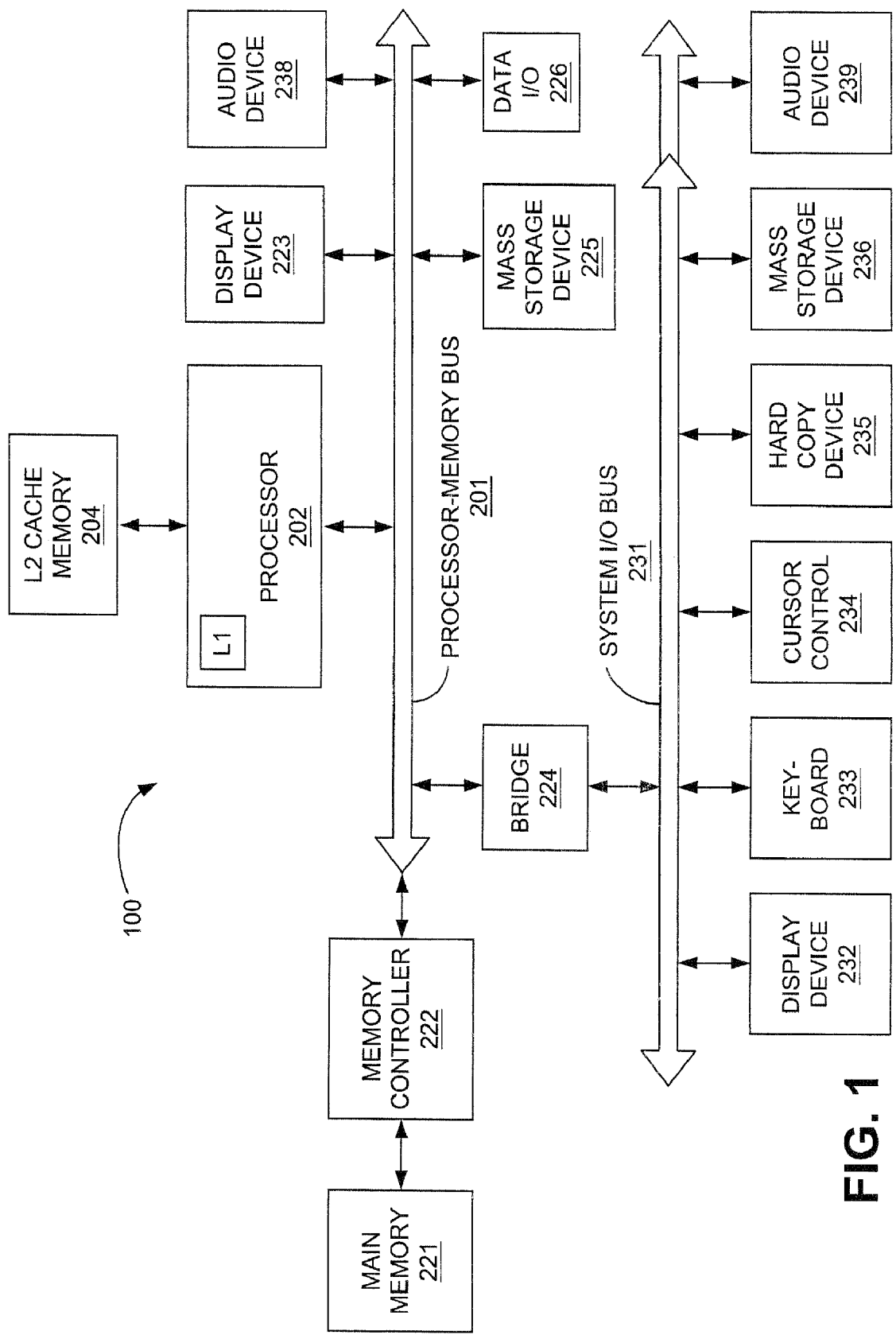
FIG. 1 is a block diagram of a computing device for multimedia processing, such as streaming video from the Internet, video teleconferencing, surveillance systems, digital imaging, communications, and media applications.

FIG. 1 a block diagram of a computing device 100 for multimedia processing, such as streaming video from the Internet, video teleconferencing, surveillance systems, digital imaging, communications, and media applications. The computing device 100 may also be used for DVD and CD playback, and presenting multimedia content on a television display or through a set-top box. The computing device 100 generally comprises a processor-memory bus or other communication means 201 for communicating information. The processor-memory bus 201 includes address, data and control buses and is coupled to multiple devices or agents. The processor 202 may include a small, extremely fast internal cache memory, commonly referred to as a level one (L1) cache memory for temporarily storing data and instructions on-chip. Multiple processors may be used in the computing device 100 for processing information in conjunction with processor 202. A second processor may comprise a parallel processor, such as a processor similar to, or the same as, the processor 202. Alternatively, an additional processor may comprise a co-processor, such as a digital signal processor. In addition, a bigger, slower level two (L2) cache memory 204 can be coupled to processor 202 for temporarily storing data and instructions for use by processor 202. In one embodiment, the processor 202 is an Intel architecture-compatible microprocessor, although the processor may be another type of processor. Alternatively, system 100 could be a desktop personal computer designed for either home or office use, or a larger mainframe or file-server system.

The processor-memory bus 201 provides system access to the memory and input/output (I/O) subsystems. A memory controller 222 is coupled to the processor-memory bus 201 for controlling access to a random access memory (RAM) or other dynamic storage device 221 (commonly referred to as a main memory) for storing information and instructions for the processor 202. A mass data storage device 225, such as a magnetic disk and disk drive for storing information and instructions, a display device 223, such as a cathode ray tube (CRT), a liquid crystal display (LCD), etc., for displaying information to the computer user, and an audio device 238, such as a loud speaker for communicating sound to the computer user, may be coupled to the processor-memory bus 201. In addition, a data input/output (I/O) device 226 is coupled to the processor-memory bus 201 for receiving or transmitting data between the computing device 100 and other devices or communications medium (not shown).

An I/O bridge 224 is coupled to the processor-memory bus 201 and system I/O bus 231 to provide a communication path or gateway for devices on either processor-memory bus 201 or I/O bus 231 to access or transfer data between devices on the other bus. Essentially, the I/O bridge 224 is an interface between the system I/O bus 231 and the processor-memory bus 201, and may be a hardware controller, a USB controller, or other device known in the art for interfacing peripherals with the processor-memory bus 201. The system I/O bus 231 communicates information between peripheral devices in the computer system. Devices that may be coupled to the system I/O bus 231 include a display device 232, which may be similar to the display device 223, a keyboard 233 including alphanumeric and other keys, etc., for communicating information and command selections to other devices in the computer system (for example, the processor 202), a mouse 234 for controlling cursor movement, and an audio device 239, which may be similar to the audio device 238. Moreover, a hard copy device 235, such as a plotter or printer, and a mass storage device 236, such as a magnetic disk and disk drive, may also be coupled to the system I/O bus 231.

Use of the computing device 100 for multimedia processing may not require all of the above components. For example, certain implementations of the computing device may include additional processors or other components. For example, the display device 223, audio device 238, or mass storage device 225 may not be coupled to the processor-memory bus 201. Furthermore, the peripheral devices shown coupled to the system I/O bus 231 may be coupled directly to the processor-memory bus 201; in addition, in some implementations only a single bus may exist with the processor 202, memory controller 222, and peripheral devices 232- 236 coupled to the single bus.

Figure 2:
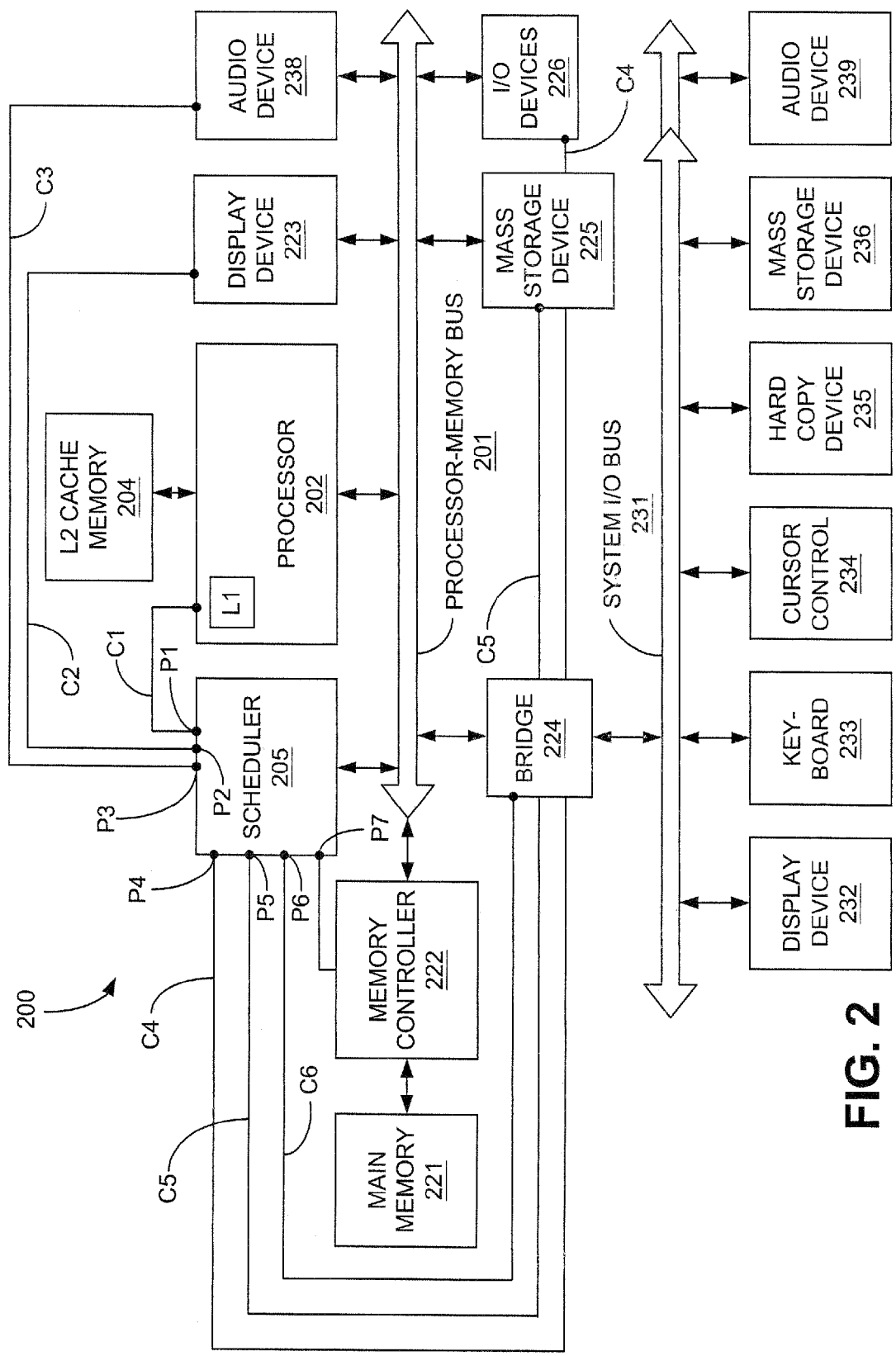
FIG. 2 shows an overview of a computing device for multimedia processing that includes a scheduler, in accordance with an embodiment of the present invention.

FIG. 2 shows an overview of a computing device 200 for multimedia processing that includes a scheduler 205, in accordance with an embodiment of the present invention. The computing device 200 is substantially similar to the computing device 100, and additionally includes the scheduler 205 coupled to the processor-memory bus 201.

Using the computing device 100 of FIG. 1 for multimedia processing will require scheduling real-time requests to prevent artifacts in the output and input. As described previously, the EDF algorithm is commonly used in computing devices, such as computing device 100, for multimedia processing. This algorithm schedules real-time requests to guarantee on-time delivery of data necessary for multimedia processing, and will not run a non-real-time request until all real-time requests have been serviced. When all bandwidth is needed for real-time requests, non-real time requests wait for access and the computing device 100 may be unable to continue operation until real-time access has been completed, forcing it to idle or stall, and degrading performance or completely halting its performance. The scheduler 205 extends the EDF algorithm by giving non-real-time requests a priority to run if, and only if, all current and possible future real-time requests can still be executed within the required time constraints. This improves system performance by giving non-real-time requests some priority while still guaranteeing that real-time requests will meet service deadlines. In the embodiment illustrated, the scheduler 205 schedules access to the main memory 221 by the memory controller 222, display 223, audio device 238, and I/O devices 226 (the real-time devices), and the processor 202, I/O bridge 224, and storage device 225 (the non-real-time devices). In other embodiments, however, the scheduler 205 may schedule access to another device by other real-time and non-real-time devices. Furthermore, in this embodiment the scheduler 205 is a dedicated hardware device, although it may be omitted from the computer 200 and another device such as the processor 202 may execute the scheduling algorithm. But implementing the scheduling algorithm with the dedicated scheduler 205 frees the processor 202 to devote more processing time to other requests.

I/O device 226 typically is a digital I/O device, or may be a plurality of digital devices. Such devices typically have limited buffer capability and high bandwidth needs, such as live-video capture units, digital video and audio input/output ports, high-speed communication controllers, and the like. Input devices of this nature must offload their data quickly into main memory 221 before more data arrives which would overflow their small internal buffers. Output devices of this nature must read more data from memory quickly before their currently buffered data has all been sent out to prevent them from running out of data.

More specifically, the scheduler 205 may be any type of hardware or software device capable of executing logical instructions in a computing environment. For example, the scheduler 205 may be a single hardware device that is integrated on the same chip as the processor 202, or may be a separate device, such as an Application Specific Integrated Circuit (ASIC) or a programmable logic device (PLD) coupled to the processor-memory bus 201. Alternatively, the scheduler 205 may be a plurality of cooperating devices. The scheduler 205 includes logic that implements the scheduling algorithm and grants access to the shared resource (here the memory 221) by requesting devices according to the calculated schedule. The scheduler 205 includes ports P1 through P7, which are coupled to the devices requesting access to the memory 221. Three of the ports P2, P3, and P4 are configured as real-time ports and are thus coupled to the display device 223, audio device 238, and data I/O device 226, which are the real-time requesters. Consequently, the number M of real-time requesters handled by the scheduler 205 equals three in this embodiment, although M can have other values in other embodiments. M is a design determination that establishes the maximum number of real-time clients or requesters that may be handled by the scheduler 205. The remaining ports P1, P5, and P6 are configured as non-real-time ports and are thus coupled to the processor 202, bridge 224, and mass-storage device 225, which are the non-real-time requesters. Memory controller 222 is not a client of the scheduler 205 because is does not generate requests, but it does receive directions from the scheduler 205 via port P7. The scheduler 205 also includes a memory (not shown) that stores the latency L and the maximum duration D for each of the real-time requestors, and the maximum duration for each of the non-real-time requesters. These values may be pre-programmed into the scheduler, or may be programmed into the scheduler memory during boot of the system 200, or during another time.

Still referring to FIG. 2, the scheduler 205 schedules access to the main memory 221 giving priority to one or more non-real-time requests if, and only if, all current and possible future real-time requests can still be executed on time. As discussed above, the scheduler 205 stores a minimum access latency $L_1$ and a maximum access duration $D_1$ of each real-time requester $R_1$ (i=requester index for i=1 . . . N). When a real-time device requests access to the memory 221, the device can provide values of Li and Di, or the scheduler 205 can calculate Li and Di based on the request. But when the scheduler takes into account potential real-time requests (i.e., requests that could be made but that have not yet been made), it uses the stored value for Li and the stored maximum value for Di. As discussed below in conjunction with FIG. 3, the scheduler 205 updates the actual/potential request queue every clock cycle and allows only one device at a time (whether real-time or non-real-time), to access the memory 221.

Figure 3:
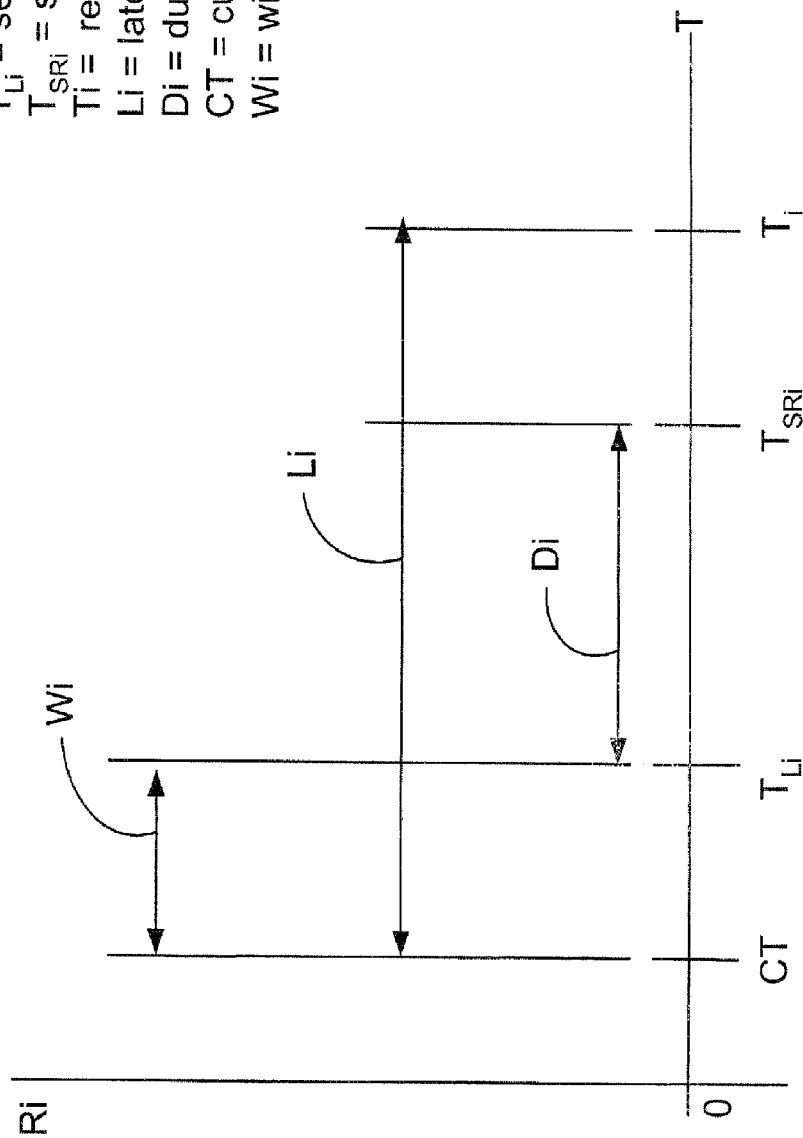
FIG. 3 illustrates several parameters of a real-time service request by a requester $R_1$ used in scheduling service by a shared resource according to an embodiment of the invention.

FIG. 3 illustrates several parameters of a real-time service request by a real-time requester $R_1$ according to an embodiment of the invention. As discussed above, the latency $L_1$ represents the time between when the requester of request $R_i$ issues the request at current time T for service to the scheduler 205 and the required service completion time $T_i$. The duration $D_1$ represents the duration of the access requested, i.e., how long the requestor of request $R_1$ will need to access the memory 221, from the start of the access at $T_{L1}$ to the completion of the access at $T_{SR1}$. As discussed above, the duration $D_i$ may vary depending on the type of request. For example, the more data that the requester of request $R_1$ needs to transfer to/from the memory 221, the longer the duration $D_i$ of the access.

Because the duration $D_1$ is usually less than the latency $L_1$, and because the service requirements of the requester of request $R_i$ are satisfied when the service completion time $T_{SR1}$ occurs no later than the required service completion time $T_1$ ($T_{SR1}=T_1$), a window of time $W_i$ may exist between when a requester $R_1$ issues a service request at time T and when the service must be completed at time $T_1$. When a non-real-time request is pending and has a duration D that is less than or equal to the window of time $W_1$, the scheduler 205 may grant the non-real-time request priority for servicing during the window $W_1$ and still allow for timely service of the real-time request $R_1$. Consequently, as described below, in one aspect of the invention, the scheduler 205 looks ahead and determines whether a window of time $W_i$ is available after all received and potential real-time requests are accounted for, and if so, whether a pending non-real-time request can be serviced during $W_1$.

FIGS. 4a–d illustrate scheduling two real-time service requests such that a window of time W is available for priority servicing of a non-real-time request R having a duration D, according to an embodiment of the invention.

As illustrated in FIGS. 4a–b, at current time T, two real-time requesters have issued requests $R_1$ and $R_2$ having latencies $L_1$ and $L_2$, and durations $D_1$ and $D_2$, respectively. FIG. 4c illustrates the two real-time requests $R_1$ and $R_2$ scheduled in a manner that provides a window of time W available for priority servicing of a non-real-time request having a duration D that is less than or equal to W. While FIGS. 4a–c illustrate aspects of the algorithm for two real-time requests, the scheduler 205 can schedule any number of real-time requests in a similar manner. FIG. 4d illustrates a non-real-time request R having a duration D scheduled in window of time W to be performed before real-time request R.

Scheduling or sequencing real-time requests $R_1$ and $R_2$ is relatively straightforward with EDF scheduling. The process closest to its deadline has highest priority. EDF works relatively well when sufficient time exits to start request $R_1$ and finish it by time $T_1$, and then start request $R_2$ and finish it by time $T_2$. However, EDF does not schedule non-real-time requests unless no real-time requests are pending.

As will be described in additional detail below, the scheduler 205 pushes all the real-time requests out as far as possible in time to open a maximum window W for scheduling non-real-time requests. The scheduler 205 looks at all real-time requests and determines the latest (or furthest out in time) service start time that will allow all real-time requests to be performed. This provides the maximum window W. For the example illustrated in FIGS. 4a–c where $D_2 > T_2 - T_1$, the scheduler 205 schedules the real-time request $R_1$ for a time of start TS at $TL_1 = T_2 - D_2 - D_1$ because it has the earliest required service completion time $T_1$. That the service of the request $R_1$ will be completed before $T_1$ is of no consequence because $T_1$ is merely the latest time for completion of the request $R_1$; completion of the request $R_1$ before $T_1$ is allowed. The scheduler 205 schedules the real-time request $R_2$ to start at $TL_2 = T_2 - D_2$. When $D_2 < T_2 - T_1$, the scheduler 205 schedules the real-time request $R_1$ to complete at service completion time $T_1$.

The scheduling allocates sufficient time to guarantee performance of the real-time service requests $R_1$ and $R_2$, and provide the window of time W for a non-real-time request having a duration D less than or equal to W If at current time T no real-time request $R_2$ has been received from the real-time requester, then the scheduler 205 anticipates a real-time request $R_2$ having the duration $D_2$ so that sufficient time is reserved in case the requester $R_2$ issues such a request before time $T_{SR1}$. Typically, the scheduler 205 updates the schedule of all pending and potential requests once each clock cycle of the shared resource.

A conventional EDF algorithm is guaranteed to produce a workable schedule if $$\sum_i \frac{D_i}{L_i} \leq 1,$$

which corresponds to the requirement that the combined real-time traffic requirements do not exceed the bus capacity at any time. The standard EDF works by servicing the request with the earliest completion deadline next. Under the above condition, this is guaranteed to yield a schedule where all deadlines for real-time requests are met, but may delay non-real-time requests until no real-time requests are pending, which will eventually happen if the sum of all real-time bandwidth requirements does not exceed capacity. As this sum approaches capacity, the delays may grow very long. When the remaining non-real-time bandwidth is less than the amount needed for a requested non-real-time transaction, the delay becomes infinite, and starvation occurs.

The scheduler 205 grants a priority access to the shared resource for a non-real-time request while timely handling up to M real-time requesters, each requester making one real-time request at a time, and each request $R_i$ having a latency $L_i$ and a duration $D_i$. To do this, the scheduler 205 makes the following assumptions: for any requester, the time between its requests $R_1$ must be at least $L_1$, since it is processing data at a fixed (or maximum) rate corresponding to the amount transferred in one request divided by the time between requests ($L_1$). If a requester has a variable data rate, then the scheduler 205 assumes the peak rate. Furthermore, the latency $L_1$ of all requesters is known by the scheduler 205 a priori, based on the system configuration or data stored in the scheduler or available to the scheduler. If the duration depends on request parameters such as requested data size, etc., the scheduler 205 may be unable to accurately determine the duration for an anticipated request. Therefore, the scheduler 205 uses a worst-case value to guarantee that it never grants a non-real-time request where this could lead to missing a real-time deadline for a device that currently has no request pending (and which the scheduler thus schedules as an anticipated request). Additionally, all devices with real-time transfers and their data rates are known and guaranteed not to exceed the available capacity.

If at time T, there are N (where $N \leq M$) real-time requests with required completion times $Ti = T + Li$, for $i = 1 \ldots N$ and durations $Di$, then the scheduler effectively extends EDF with non-real-time request handling by:

1. adding 'anticipated' requests for the M-N requesters that currently have no active pending request, using their known latency values $Li$, so that there are now M requests to be processed;

2. preparing an ordered list of real-time requests as requests $R_1 - R_M$ according to completion time $T_{R1} \ldots T_{RM}$, each request R having durations $D_{R1} \ldots D_{RM}$; such that $R_1$ is earliest request for service to be completed as determined by completion time $T_{R1}$, and $R_M$ is the latest;

3. calculating a latest service start time $T_{L1}$ for every request sub-sequence shown below for pending and anticipated real-time requests, as follows:

$R_1$ only: $T_{L1} = T_{R1} - D_{R1}$ $R_2 \ldots R_1: T_{L2} = T_{R2} - D_{R2} - D_{R1}$

. . .

$R_M \ldots R_1: T_{LM} = T_{RM} - D_{RM} - \ldots - D_{R1};$ 4. selecting a service start time $T_S$ that is the earliest of all the calculated latest service start time $T_{L1}$ for every sub-sequence ($T_S = \text{MINi}(TL_{L1})$);

5. when $T + D < T_S$ for a non-real-time request R, granting the non-real-time request; otherwise 6. granting the real (not anticipated) real-time request having the earliest system time value access to the resource.

$\text{MINi}(T_{L1})$ is the time nearest time T that $R_1$ must be started to finish all M real-time requests. In other words, of all the latest service start times, ($T_{L1}$), $\text{MINi}(T_{L1})$ is the earliest of the latest service start times, the time that is closest to current time T.

The step of adding the 'anticipated' requests makes a worst-case prediction about real-time requesters that are currently inactive. This step assumes that all real-time requesters that have not requested service will do so immediately following the current evaluation of the scheduler algorithm at time T. Thus, all the latency L requirements of the requesters will be met. The requesters may not always place a request, but an access to the shared resource of their maximum duration D is reserved for them. The anticipated duration would be a worst-case value that is known by the scheduler 205, e.g., it could be a programmed value for each requester just like the latency values.

The step of ordering the requests produces a list of all requests, both actual and anticipated, in ascending order of required completion time, i.e., the first element in the list (R1) is the earliest, or the first request to be completed, the next element (R2) is the next one to complete, and so on. Request RM is the latest request scheduled to be completed. This is a dynamic ordering system, and the order of requests will likely change each time the algorithm is run.

The step of calculating the latest service start time for every sub-sequence determines the latest possible time at which the first element must start service in order to satisfy the on-time completion of all elements in the list. On-time completion of the $i^{th}$ element can be guaranteed if the list is started no later than the completion time for element i minus the duration of all list elements up to and including i. This latest start time is calculated for all list elements, and then the earliest of all these start time values is taken as the absolute latest time to start service of the list of real-time requests MINi($T_{L1}$). This is the time to start real-time request $R_1$ to be sure request $R_M$ is timely completed.

If MINi($T_{L1}$) is some time D after current time T, then a window W exists of width D for the scheduler 205 to safely grant service to a non-real-time request R whose duration will not exceed D. There is a method for selecting which non-real-time request will be granted service during the window W that is beyond the scope of the invention described in these specifications. For example, the non-real-time requests may have their own arbitrator (not shown), which will grant one or more of the requests access during the window W. Every other non-real-time request waits until the selected non-real-time request is completed.

The above steps are performed once for each time the scheduler grants access to a request. After the request is completed, the scheduler will repeat the above scheduling steps with all then currently outstanding and anticipated real-time requests to determine which request to service next, and whether a window W is available for servicing a non-real-time request.

Figure 5:
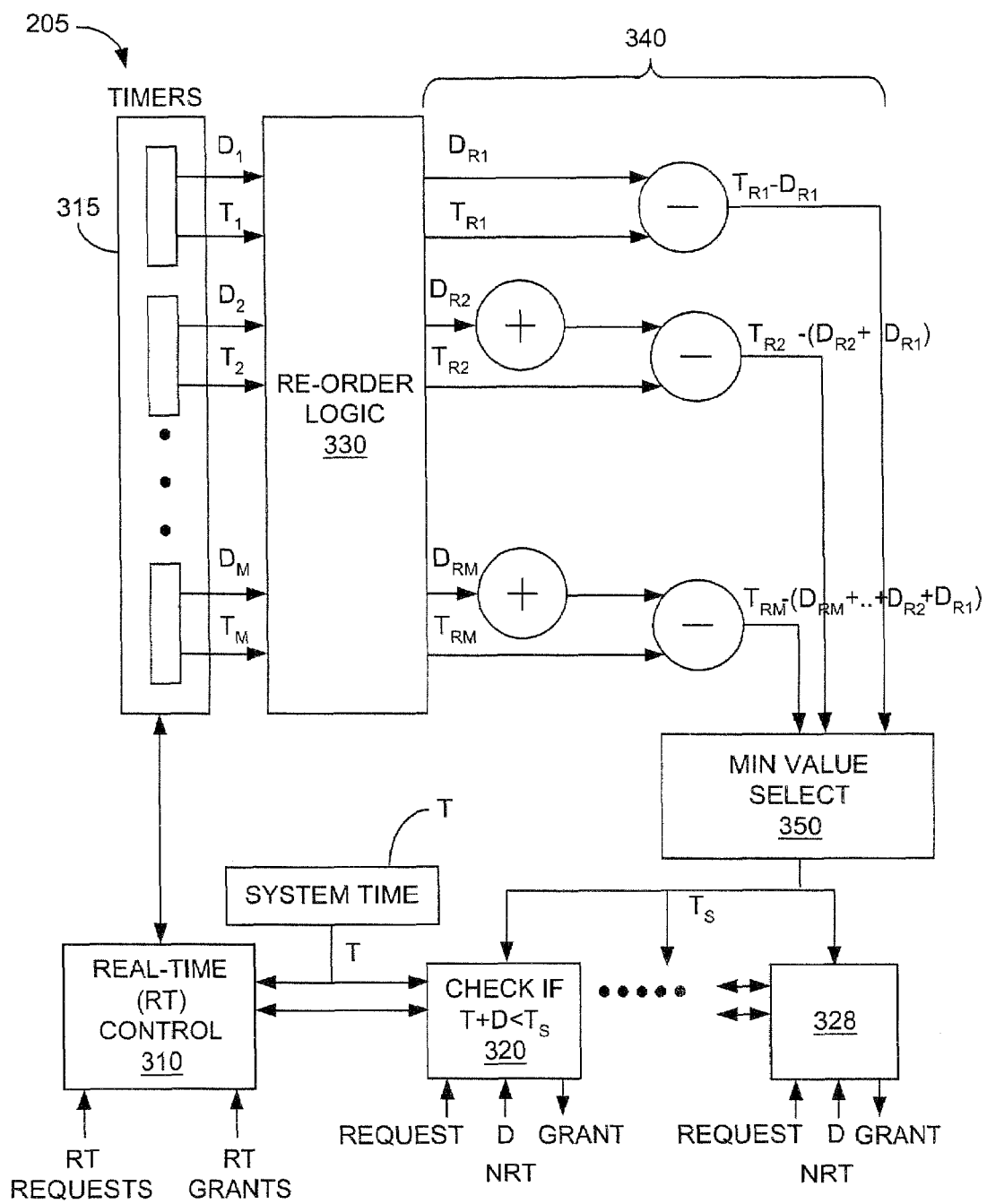
FIG. 5 is a schematic representation of a scheduler in a hardware configuration, according to an embodiment of the invention.
Figure 6:
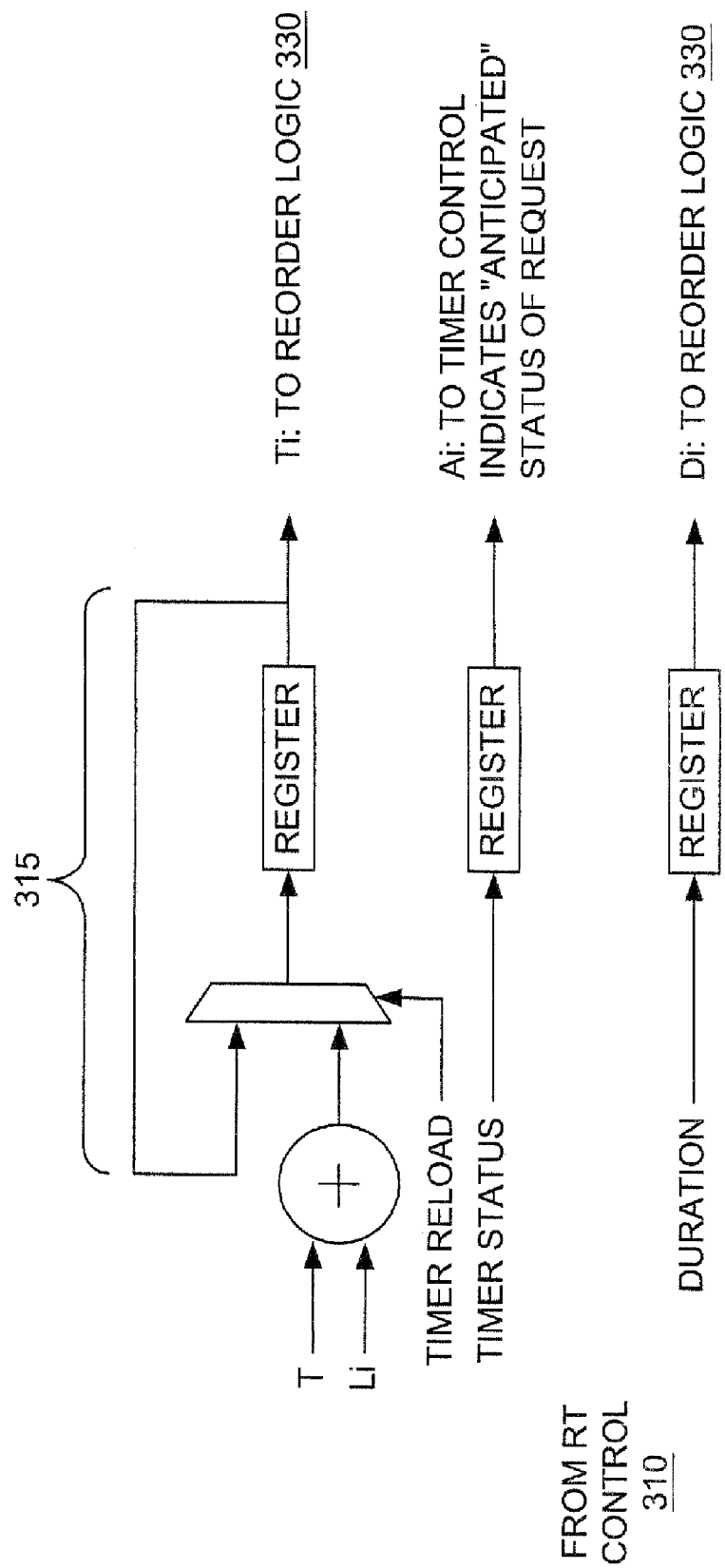
FIG. 6 illustrates elements of the registers in the timers circuit of the scheduler of FIG. 5, according to an embodiment of the invention.

FIG. 5 is a schematic representation of the scheduler 205 in a hardware configuration, according to an embodiment of the invention. FIG. 6 illustrates elements of the registers in the timers circuit 315 of the scheduler 205 of FIG. 5, according to an embodiment of the invention. As discussed below, the scheduler 205 implements the scheduling described above.

Referring to FIGS. 5 and 6, a real-time request control circuit 310 receives real-time requests from clients in a computing device, such as computer system 200, that need real-time access to the shared resource, and issues grants to these requesters. A series of non-real-time request control circuits, illustrated as circuits 320–328 and preferably one for each non-real-time requester, receives non-real-time requests from non-real-time-requester clients in a computing device, such as computer system 200, that need non-real-time access to the shared resource, and grants shared-resource access to these requesters. Circuits 310 and 320–322 interact to make sure that only one requestor is granted access to the shared resource at a time.

The real-time control circuit 310 receives requests from real-time requesters only and controls the registers in the timers circuit 315, which hold the status (anticipated or real requests, the deadline value $T_1$, and duration $D_1$). The method by which duration is determined is outside the scope of this circuit. It could be a programmable value, or some value that is derived from request parameters by some mathematical expression that is implemented in hardware as well, which are not shown or described. When a real-time requester issues a new request, the deadline is calculated and put into the Ti register as shown in FIG. 6, and the status is set to 'real', as opposed to 'anticipated'. When the request is granted or has already been granted but no new request is issued by the requester, then the status is set to 'anticipated' and the anticipated deadline is reloaded every cycle until a real request is received. While a real request is pending, the value of Ti does not change until the request is serviced.

Figure 7:
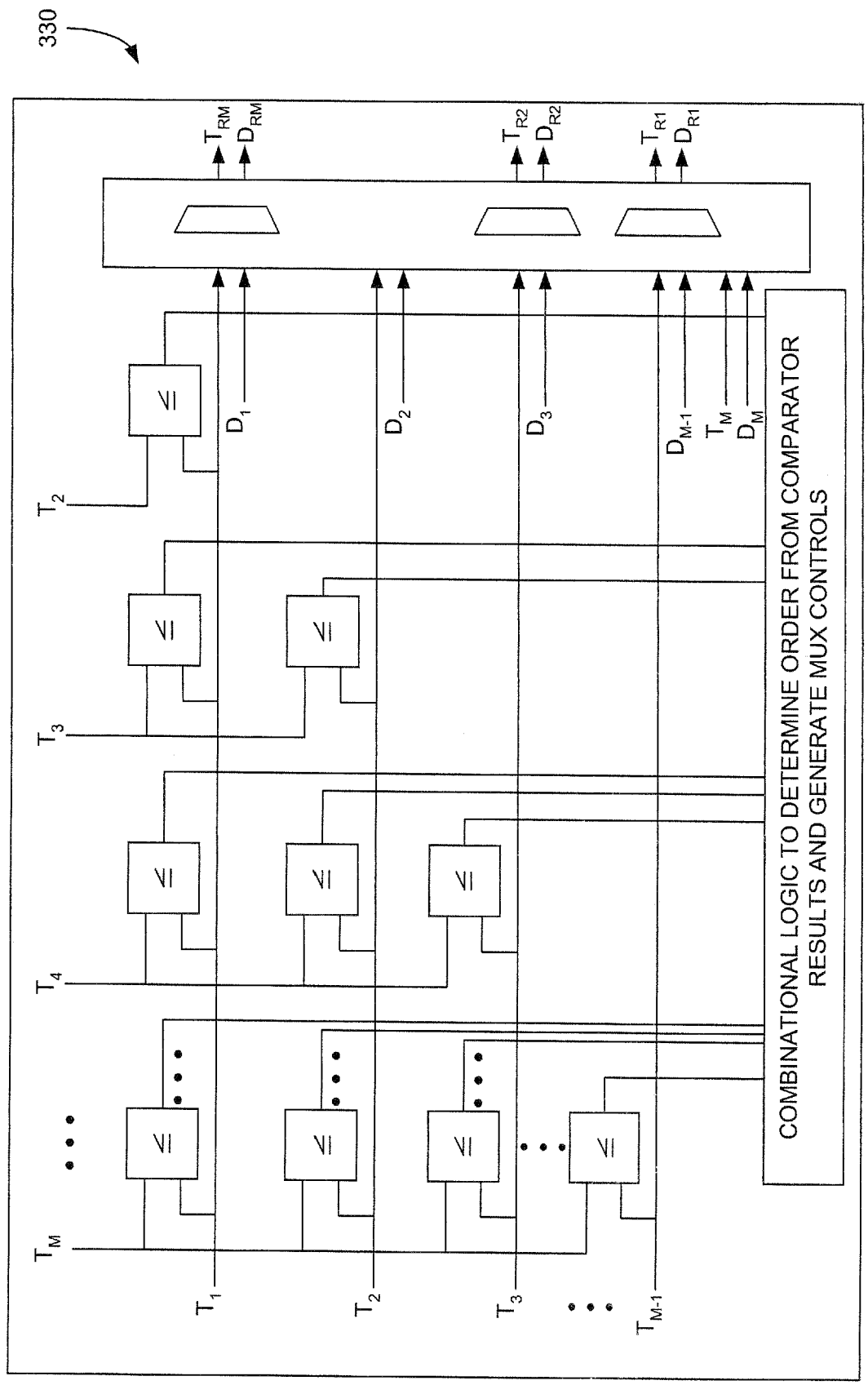
FIG. 7 is a schematic representation of the reorder logic circuit 330 of the scheduler of FIG. 5, according to an embodiment of the invention.

FIG. 7 is a schematic representation of the reorder logic circuit 330 of the scheduler of FIG. 5, according to an embodiment of the invention. The reorder logic circuit 330 performs the task of arranging the M pairs of (Ti, Di) for each request R in ascending order of Ti value. The output pair ($T_{R1}$, $D_{R1}$) has the earliest (or lowest or soonest) system time T value and the output pair ($T_{RM}$, $D_{RM}$) has the latest (or highest) system time T value. To decide the order of the values, each pair of T values from the list $\{T_1, \ldots, T_M\}$ needs to be compared in magnitude to decide which one is greater. This requires $M*(M-1)/2$ comparators. The results are single-bit outputs from each of those comparators indicating that Ti≦Tj for all different combinations of i and j. These results can be combined in logic equations to derive which value is smallest, which one is the next smallest, etc. A set of M multiplexers, each selecting one out of M inputs then produces the final outputs.

Returning to FIG. 5, a network 340 of adders and subtractors calculate the earliest start times of all sequences {R1, R2 . . . R1, R3 . . . R1, . . . , RM . . . R 1}. The MIN value select circuit 350 finds the earliest (or (MINi($T_{L1}$)) of all these values ($T_S$) and passes it to its output. The non-real-time control circuits 320-328, with block 320 being labeled as "check if T+D<TS," receive non-real-time requests and their duration values D. The circuits 320–328 check if there is enough time available between current time T and the required real-time service start time $T_S$ to insert a non-real-time request. All non-real-time requests can be checked in parallel. If one or more would fit, a non-real-time request is granted access instead of the earliest real-time requester (R1), otherwise the 'real (not anticipated) real-time request having the earliest required service completion time is granted access.

In an alternative embodiment, the scheduler 205 may be implemented in software, and the functions of the circuits described in conjunction with FIGS. 5–7 performed by modules of the software.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. A scheduler for scheduling access in a computing environment to a resource, the scheduler comprising:
   a real-time request control circuit operable to receive requests from real-time requesters at system time T, and to anticipate requests for real-time requesters that currently have no active request using their known latency Li and duration Di values, so that there are M real and anticipated real-time requests to be scheduled;
   a timer circuit having registers operable to hold a plurality of M real-time requests, each request Ri having a status of anticipated or real, a required service completion time Ti, and a duration Di;
   a reorder logic operable to prepare an ordered list of the M real-time requests in ascending order of required service completion dines TR1 ... TRM, beginning with the real-time request having the earliest required service completion time being designated as request R1 with a required service completion time TR1 and a duration DR1, and the ascending order concluding with the real-time request having the latest required service completion time being designated as request RM with a required service completion time TRM, and a duration DRM;

a network of adders and subtractors operable to calculate the latest service start time TLi for every request subsequence {R1, R2R1, R3 ... R1, ..., RM...R1} that will provide on-time completion of the plurality M of real-time request;

a minimum value select circuit operable to find the earliest calculated latest service start time TS; and a non-real-time request scheduling circuit that includes a plurality of non-real-time control circuits, each control circuit being operable to receive a different non-real-time request R and its duration value D, and to check whether T+D<TS for the non-real-time request R handled by it, the real-time request control circuit and non-real-time request scheduling circuit being cooperatively arranged such that when T+D<TS for a non-real-time request R, the non-real-time request scheduling circuit grants the non-real-time request R access to the resource, otherwise the real-time request control circuit grants the real (not anticipated) real-time request having the earliest required service completion time access to the resource.

2. The scheduler of claim 1, wherein the scheduler is operable to schedule access again after completion of the granted request.

3. The scheduler of claim 1, wherein the scheduler is operable to schedule access each clock cycle of the shared resource.

4. The scheduler of claim 1, wherein the real-time request control circuit is further operable to control registers in the timer circuit.

5. A method for scheduling access in a computing environment to a resource having a real-time request capacity M, comprising the steps of:

receiving requests for access to the resource from N real-time requesters, each real-time request Ri (i=requester index for i=1 ... N) having a latency Li and a duration Di;

anticipating requests for M-N real-time requesters that currently have no active request using their known latency Li and duration Di values, so that there are now M anticipated, and real (not anticipated) real-time requests for access to be scheduled;

preparing an ordered list of the M real-time requests as requests R1–RM according to completion time TR1 ... TRM, each request having durations DR1 ... DRM, such that R1 is earliest request for service to be completed as determined by completion time TRI, and RM is the latest;

(i) calculating a latest service start time TLi for every request subsequence shown below for pending and anticipated real-time requests, as follows:

$R1$ only: $Tb1=TR1-DR1$ $R2 ... R1: TL2=TR2-DR2-DR1$

...

$RM ... R1: TLM=TRM-DRM- ... -DR1;$ selecting a service start time TS that is the earliest of all the calculated latest service start time TLi for every sub-sequence (TS =MINi(TLi)); and granting a non-real-time request R when T+D<TS for the non-real-time request R, otherwise granting the real (not anticipated) real-time request having the earliest required service completion time access to the resource.

6. The method of claim 5, wherein the method is implemented by hardware.

7. The method of claim 5, wherein the method includes the further step of repeating the steps after completion of the granted request.

8. The method of claim 5, wherein the method includes the further step of repeating the steps each clock cycle of the resource.

9. The method of claim 5, wherein the step of adding anticipated requests for real-time requesters that currently have no active request further includes using a maximum anticipated duration Di.

10. A scheduler for scheduling access to a resource in a computing environment, the scheduler comprising:

a means for receiving requests for access to the resource from N real-time requesters, each real-time request Ri (i=requester index for i =1N) having a latency Li and a duration Di;

a means for anticipating requests for M-N real-time requesters that currently have no active request using their known latency Li and duration Di values, so that there are now M anticipated and real (not anticipated) real-time requests for access to be scheduled;

a means for preparing an ordered list of the M real-time requests as requests R1–RM according to completion time TR1 ... TRM, each request having durations DR1 ... DRM, such that R1 is earliest request for service to be completed as determined by completion time TR1, and RM is the latest;

(i) a means for calculating a latest service start time TLi for every request sub-sequence shown below for pending and anticipated real-time requests, as follows:

$R1$ only: $TL1=TR1-DR1$ $R2 ... R1: TL2=TR2-DR2-DR1$

...

$RM ... R1: TLM=TRM-DRM- ... -DR1;$ a means for selecting a service start time TS that is the earliest of all the calculated latest service start time TLi for every sub-sequence (TS=MINi(TLi)); and a means for granting a non-real-time request R when T+D<TS for the non-real-time request R, otherwise granting the real (not anticipated) real-time request having the earliest service completion time access to the resource.

* * * * *

UNITED STATES PATENT AND TRADEMARK OFFICE
CERTIFICATE OF CORRECTION

PATENT NO. : 7,093,256 B2
APPLICATION NO. : 10/318435
DATED : August 15, 2006
INVENTOR(S) : Rudolf Henricus Johannes Bloks It is certified that error appears in the above-identified patent and that said Letters Patent is hereby corrected as shown below:

Column 11, Line 56; Patent reads "M anticipated," and should read --M anticipated --

Column 11, Line 62; Patent reads "TRI" and should read -- TR1 --

Column 12, Line 34; Patent reads "1N" and should read -- 1...N --

Signed and Sealed this

Thirtieth Day of October, 2007

JON W. DUDAS
*Director of the United States Patent and Trademark Office*